US010676899B2

(12) United States Patent
Kim

(10) Patent No.: US 10,676,899 B2
(45) Date of Patent: Jun. 9, 2020

(54) SAFETY SYSTEM FOR CONSTRUCTION MACHINE

(71) Applicant: DOOSAN INFRACORE CO., LTD., Incheon (KR)

(72) Inventor: Ki Yong Kim, Seoul (KR)

(73) Assignee: DOOSAN INFRACORE CO., LTD., Incheon (KR)

(*) Notice: Subject to any disclaimer, the term of this patent is extended or adjusted under 35 U.S.C. 154(b) by 0 days.

(21) Appl. No.: 16/300,408

(22) PCT Filed: May 16, 2017

(86) PCT No.: PCT/KR2017/005048
§ 371 (c)(1),
(2) Date: Nov. 9, 2018

(87) PCT Pub. No.: WO2017/200257
PCT Pub. Date: Nov. 23, 2017

(65) Prior Publication Data
US 2019/0226180 A1 Jul. 25, 2019

(30) Foreign Application Priority Data

May 18, 2016 (KR) .................. 10-2016-0060924

(51) Int. Cl.
E02F 9/22 (2006.01)
F15B 20/00 (2006.01)
(Continued)

(52) U.S. Cl.
CPC .......... E02F 9/2285 (2013.01); E02F 9/2004 (2013.01); E02F 9/226 (2013.01);
(Continued)

(58) Field of Classification Search
CPC ...... F15B 11/166; F15B 20/00; F15B 20/008; F15B 2211/8636; F15B 2211/865; E02F 9/2282; E02F 9/2285
See application file for complete search history.

(56) References Cited

U.S. PATENT DOCUMENTS 5,052,179 A 10/1991 Fujii
5,083,428 A * 1/1992 Kubomoto ............ E02F 9/2239
60/421
(Continued)

FOREIGN PATENT DOCUMENTS

EP 0695875 A1 2/1996
EP 0709579 A2 5/1996
(Continued)

OTHER PUBLICATIONS

European Search Report dated Apr. 25, 2019 in connection with counterpart European Patent Application No. 17799614.7, citing the above references.
(Continued)

Primary Examiner — Michael Leslie
(74) Attorney, Agent, or Firm — Hauptman Ham, LLP

(57) ABSTRACT

The present disclosure relates to a safety system for a construction machine, and the safety system for a construction machine according to the exemplary embodiment of the present disclosure includes: a pilot pump which supplies a pilot working fluid; multiple spools which are operated by the pilot working fluid to control a supply of a main working fluid and each have a signal unit formed in one region thereof; a signal line which sequentially connects the pilot pump and the signal units of the multiple spools and discharges the pilot working fluid, which is supplied by the pilot pump, to a hydraulic tank; and a pressure sensor which measures pressure in the signal line.

11 Claims, 5 Drawing Sheets

(51) Int. Cl.
*F15B 11/16* (2006.01)
*E02F 9/20* (2006.01)

(52) U.S. Cl.
CPC .......... *E02F 9/2221* (2013.01); *E02F 9/2282* (2013.01); *F15B 11/166* (2013.01); *F15B 20/00* (2013.01); *B60Y 2200/412* (2013.01); *F15B 2211/86* (2013.01)

(56) References Cited

U.S. PATENT DOCUMENTS

| | | | | |
|---|---|---|---|---|
| 5,568,727 A | * | 10/1996 | Chung | E02F 9/2239 60/421 |
| 5,590,730 A | * | 1/1997 | Chung | B62D 11/04 180/6.3 |
| 5,680,759 A | * | 10/1997 | Chung | B62D 11/183 60/421 |
| 5,960,378 A | | 9/1999 | Watanabe et al. | |
| 7,036,308 B2 | * | 5/2006 | Rollmann | B66F 9/22 60/422 |
| 7,395,662 B2 | * | 7/2008 | Kauss | E02F 9/2225 60/399 |
| 2013/0146163 A1 | * | 6/2013 | Kim | E02F 9/2228 137/565.16 |
| 2015/0330058 A1 | * | 11/2015 | Lee | E02F 9/2242 701/50 |

FOREIGN PATENT DOCUMENTS

| | | |
|---|---|---|
| JP | 2005207065 A | 8/2005 |
| KR | 100200028 B1 | 6/1999 |
| KR | 100240090 B1 | 1/2000 |
| KR | 1020130111532 A | 10/2013 |
| KR | 1020150036000 A | 4/2015 |

OTHER PUBLICATIONS

International Search Report dated Aug. 22, 2017, corresponding to International Application No. PCT/KR2017/005048 citing the above reference(s).

* cited by examiner

SAFETY SYSTEM FOR CONSTRUCTION MACHINE

TECHNICAL FIELD

The present disclosure relates to a safety system for a construction machine, and more particularly, to a safety system for a construction machine for preventing a safety accident caused by a malfunction of a main control valve.

BACKGROUND ART

Recently, there are more researches on electronic control of construction machines for intelligent excavation. In particular, an electronic proportional pressure reducing valve (EPPRV) is applied to a main control valve to electronically control the construction machine.

The electronic proportional pressure reducing valve may control, with an electrical signal, a motion of a spool for controlling a supply of a main working fluid to a traveling device and various types of working devices that require hydraulic pressure. For example, a main control valve to which the electronic proportional pressure reducing valve is applied may adjust a position of the spool in proportion to a voltage signal or a current signal applied to the electronic proportional pressure reducing valve. Specifically, the main control valve may include multiple spools, and multiple electronic proportional pressure reducing valves which are connected to the multiple spools, respectively. Further, the multiple electronic proportional pressure reducing valves adjust a pilot working fluid applied to the multiple spools to control motions of the multiple spools.

However, in a case in which there is something wrong with any one of the multiple electronic proportional pressure reducing valves or with a control unit for controlling the multiple electronic proportional pressure reducing valves, the spool moves even though an operator does not manipulate a manipulating device, and for this reason, the construction machine operates, which causes a safety accident. Accordingly, there is a need for a solution for preventing the safety accident.

DISCLOSURE

Technical Problem

An exemplary embodiment of the present disclosure provides a safety system for a construction machine which is capable of preventing a safety accident caused by a malfunction of a main control valve.

Technical Solution

According to an exemplary embodiment of the present disclosure, a safety system for a construction machine includes: a pilot pump which supplies a pilot working fluid; multiple spools which are operated by the pilot working fluid to control a supply of a main working fluid and each have a signal unit formed in one region thereof; a signal line which sequentially connects the pilot pump, the signal units of the multiple spools, and a hydraulic tank; and a pressure sensor which measures pressure in the signal line.

The safety system for a construction machine may further include: multiple electronic proportional pressure reducing valves (EPPRVs) which are connected to the multiple spools, respectively, and control the pilot working fluid to be transmitted to the multiple spools; a pilot line which connects the pilot pump and the multiple electronic proportional pressure reducing valves; and a safety shut-off valve which is provided on the pilot line between the pilot pump and the multiple electronic proportional pressure reducing valves and controls the supply of the pilot working fluid.

When the pressure in the signal line measured by the pressure sensor exceeds a predetermined pressure value, it may be determined that one or more of the multiple spools are unnecessarily moved, and the safety shut-off valve may block the pilot working fluid to be supplied through the pilot line.

The safety system for a construction machine may further include: a manipulating device which is manipulated by an operator; and a control unit which controls the pilot control valve depending on a manipulating signal of the manipulating device. Further, when the manipulating signal is generated by the manipulation of the manipulating device, the control unit may allow the safety shut-off valve to supply the pilot working fluid through the pilot line even though the pressure in the signal line measured by the pressure sensor exceeds the predetermined pressure value.

The control unit may generate a failure/warning signal when the pressure measured by the pressure sensor exceeds the predetermined pressure value and the safety shut-off valve blocks the pilot working fluid to be supplied to the multiple electronic proportional pressure reducing valves.

The signal line may branch off from the pilot line between the pilot pump and the safety shut-off valve.

The safety system for a construction machine may further include a safety shut-off lever which manipulates the safety shut-off valve. Further, the supply of the pilot working fluid through the pilot line may be cut off when the safety shut-off valve is turned off.

The safety system for a construction machine may further include a pilot control valve which is provided on the pilot line between the pilot pump and the multiple electronic proportional pressure reducing valves and controls the supply of the pilot working fluid.

When the pressure in the signal line measured by the pressure sensor exceeds a predetermined pressure value, it may be determined that one or more of the multiple spools are unnecessarily moved, and the pilot control valve may block the pilot working fluid to be supplied through the pilot line.

The safety system for a construction machine may further include: a manipulating device which is manipulated by an operator; and a control unit which controls the pilot control valve depending on a manipulating signal of the manipulating device. Further, when the manipulating signal is generated by the manipulation of the manipulating device, the control unit may allow the pilot control valve to supply the pilot working fluid through the pilot line even though the pressure in the signal line measured by the pressure sensor exceeds the predetermined pressure value.

The control unit may generate a failure/warning signal when the pressure measured by the pressure sensor exceeds the predetermined pressure value and the pilot control valve blocks the pilot working fluid to be supplied to the multiple electronic proportional pressure reducing valves.

The signal line may branch off from the pilot line between the pilot pump and the pilot control valve.

Advantageous Effects

According to the exemplary embodiment of the present disclosure, the safety system for a construction machine may prevent a safety accident caused by a malfunction of the main control valve.

DETAILED DESCRIPTION OF THE INVENTION

Figure 1:
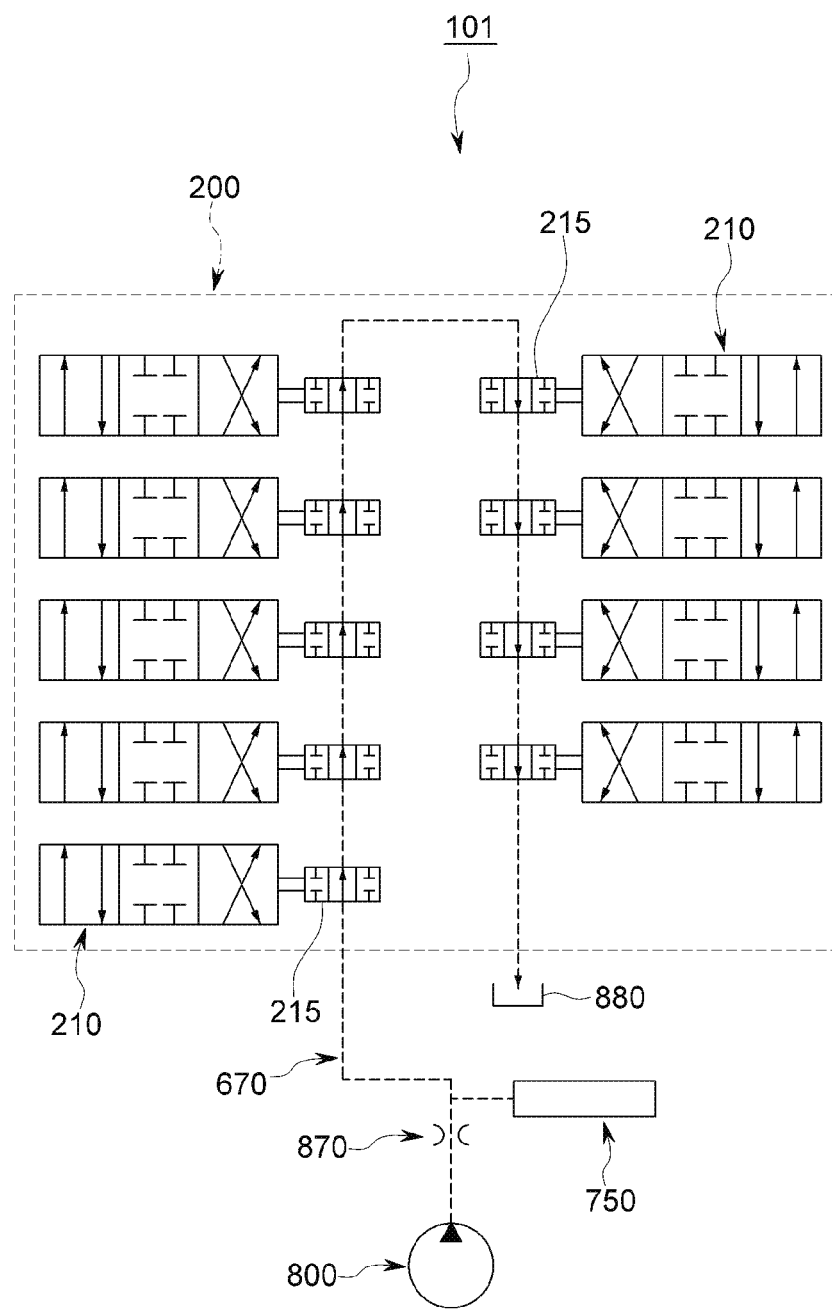
FIG. 1 is a conceptual view illustrating a safety system for a construction machine according to a first exemplary embodiment of the present disclosure.

Hereinafter, exemplary embodiments of the present disclosure will be described in detail with reference to the accompanying drawings so that those skilled in the technical field to which the present disclosure pertains may easily carry out the exemplary embodiment. The present disclosure may be implemented in various different ways, and is not limited to the exemplary embodiments described herein.

In several exemplary embodiments, constituent elements having the same configuration will be representatively described using the same reference numerals in a first exemplary embodiment, and only configurations different from the configurations in the first exemplary embodiment will be described in the other exemplary embodiments.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements or components illustrated in two or more drawings in order to exhibit similar characteristics.

Exemplary embodiments of the present disclosure concretely illustrate ideal exemplary embodiments of the present disclosure. As a result, various modifications of the drawings are expected. Therefore, the exemplary embodiments are not limited to specific forms in regions illustrated in the drawings, and for example, include modifications of forms by the manufacture thereof.

Hereinafter, a safety system 101 for a construction machine according to a first exemplary embodiment of the present disclosure will be described with reference to FIGS. 1 and 2.

In the first exemplary embodiment of the present disclosure, the construction machine may be an excavator, a hydraulic loader, or the like, as an example.

In addition, the construction machine may include working devices such as a boom or an arm disposed at a front side of a cabin, and traveling devices such as an engine or a radiator disposed at a rear side of the cabin.

In addition, the construction machine may further include a manipulating device 790 disposed in the cabin so that an operator may manipulate the manipulating device 790.

Figure 2:
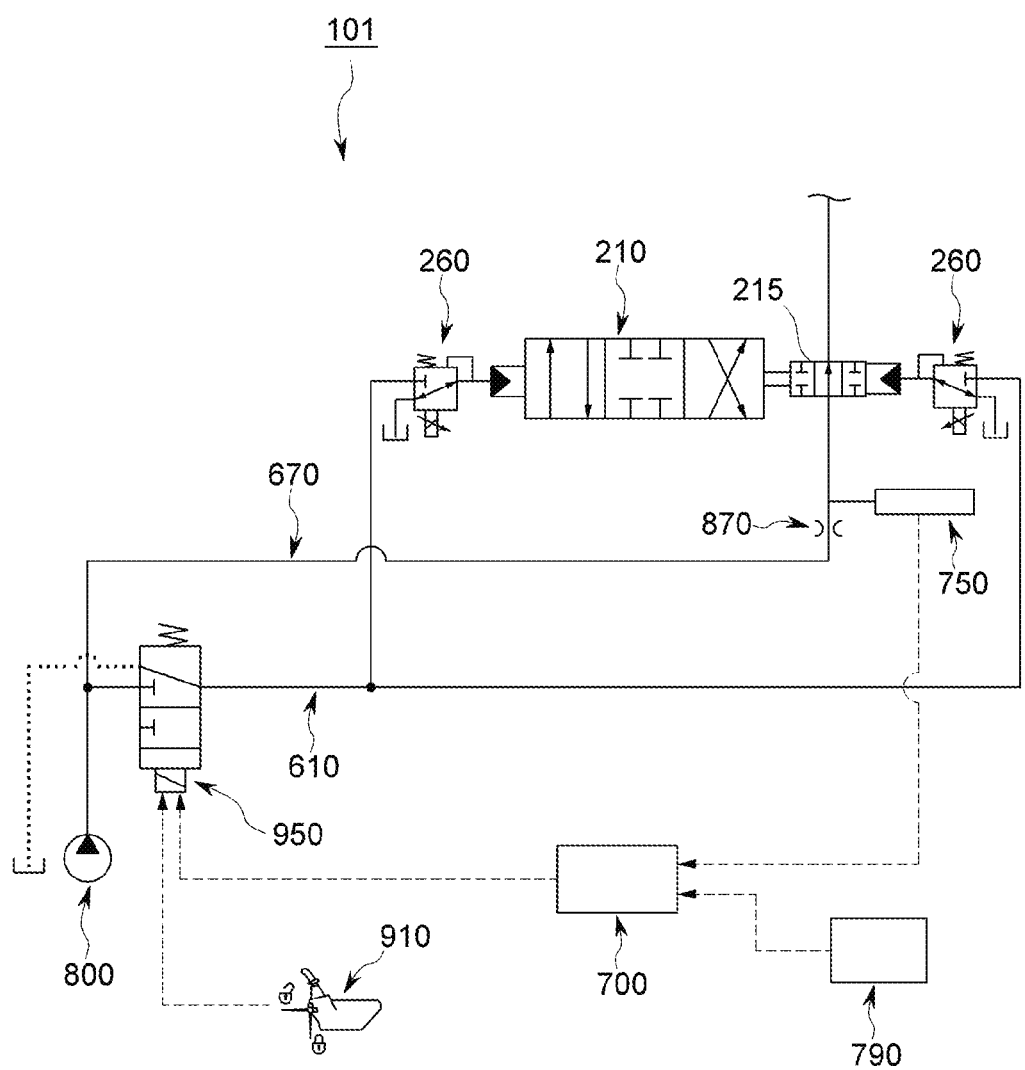
FIG. 2 is a configuration view of the safety system for a construction machine in FIG. 1.

As illustrated in FIGS. 1 and 2, the safety system 101 for a construction machine according to the first exemplar) embodiment of the present disclosure includes a pilot pump 800, multiple spools 210, a signal line 670, and a pressure sensor 750.

In addition, the safety system 101 for a construction machine according to the first exemplary embodiment of the present disclosure may further include multiple electronic proportional pressure reducing valves (EPPRVs) 260, a pilot line 610, a hydraulic tank 880, a safety shut-off valve 950, and a safety shut-off lever 910. Here, the multiple spools 210 and the multiple electronic proportional pressure reducing valves 260 may constitute a main control valve 200.

In addition, the safety system 101 for a construction machine according to the first exemplary embodiment of the present disclosure may further include a control unit 700 that controls the safety shut-off valve 950 depending on a manipulating signal of the manipulating device 790 of the construction machine which is manipulated by the operator.

In addition, the safety system 101 for a construction machine according to the first exemplary embodiment of the present disclosure may further include an orifice 870 formed in the signal line 670.

The multiple spools 210 control a supply of a main working fluid. Specifically, the multiple spools 210 control the supply of the main working fluid required to operate the working devices such as the boom or the arm or the traveling devices.

In addition, the multiple spools 210 are operated by a pilot working fluid. That is, the multiple spools 210 are moved by the pilot working fluid, such that the main control valve 200 controls the supply of the main working fluid.

In addition, in the first exemplary embodiment of the present disclosure, each of the multiple spools 210 has a signal unit 215 formed in one region thereof. The signal units 215, which are formed for the multiple spools 210, respectively, are used to detect the motions of the multiple spools 210.

Specifically, the signal units 215 are connected to the signal line 670 to be described below, and a state of connection between the signal units 215 and the signal line 670 varies depending on the motions of the multiple spools 210. When the state of connection between the signal units 215 and the signal line 670 varies as described above, resistance applied to the pilot working fluid moving along the signal line 670 varies. Further, the variation of resistance means a variation of pressure in the signal line 670.

The pilot pump 800 supplies the pilot working fluid. In the first exemplary embodiment of the present disclosure, the pilot working fluid supplied by the pilot pump 800 may be supplied to the signal line 670 and the pilot line 610 to be described below.

The multiple electronic proportional pressure reducing valves (EPPRVs) 260 are connected to the multiple spools 210, respectively, and control the pilot working fluid which is supplied to the multiple spools 210 by the pilot pump 800. That is, the pressure, which is applied to the multiple spools 210 by the pilot working fluid, varies depending on opening degrees of the multiple electronic proportional pressure reducing valves 260, and the multiple spools 210 are moved by the pressure applied by the pilot working fluid.

The pilot line 610 connects the pilot pump 800 to the multiple electronic proportional pressure reducing valves 260. That is, the multiple electronic proportional pressure reducing valves 260 control the pilot working fluid which is supplied to the multiple spools 210 through the pilot line 610 by the pilot pump 800.

The safety shut-off valve 950 is provided on the pilot line 610 between the pilot pump 800 and the multiple electronic proportional pressure reducing valves 260. The safety shut-off valve 950 controls the supply of the pilot working fluid toward the multiple electronic proportional pressure reducing valves 260 along the pilot line 610. Specifically, the pilot line may be opened when the safety shut-off valve 950 is turned on, and the pilot line may be blocked when the safety shut-off valve 950 is turned off. The safety shut-off valve 950 may be an electronic control valve, and as an example, the safety shut-off valve 950 may be an electronic proportional pressure reducing solenoid valve (EPPR solenoid valve).

The safety shut-off lever 910 may manipulate the safety shut-off valve 950. In this case, a user may manually manipulate the safety shut-off lever 910. That is, the operator may manually manipulate the safety shut-off valve 950 through the safety shut-off lever 910 in accordance with the operator's determination, thereby cutting off the supply of the pilot working fluid through the pilot line 610. Specifically, the pilot line may be opened when the safety shut-off valve 950 is turned on, and the pilot line may be blocked when the safety shut-off valve 950 is turned off.

The signal line 670 sequentially connects the pilot pump 800 to the signal units 215 of the multiple spools 210. Further, the signal line 670 discharges the pilot working fluid, which is supplied by the pilot pump 800, to the hydraulic tank 880.

Specifically, the signal line 670 may extend and branch off from the pilot line 610 between the safety shut-off valve 950 and the pilot pump 800. Further, the pilot working fluid, which moves along the signal line 670, may sequentially pass through the signal units 215 of the multiple spools 210 and then return back to the hydraulic tank 880. In addition, the pilot working fluid, which moves along the signal line 670, does not affect the motions of the spools 210, and the pilot working fluid is used to measure the motions of the spools 210.

In a state in which the multiple spools 210 are stationary without moving, that is, in a state in which the multiple spools 210 are positioned at positions at which the multiple spools 210 stop the supply of the main working fluid, the pilot working fluid, which is supplied through the signal line 670 by the pilot pump 800, passes through the signal units 215 of the multiple spools 210 while being less affected by resistance.

However, if one or more of the multiple spools 210 are moved even though the multiple spools 210 need to be positioned at the positions at which the multiple spools 210 stop the supply of the main working fluid, the signal units 215 of the spools 210 also move, such that resistance is applied to the pilot working fluid moving along the signal line 670, and pressure in the signal line 670 is increased.

Further, the pressure sensor 750 may measure the pressure in the signal line 670 and provide information that makes it possible to determine whether the spools 210 are currently moved based on the measured pressure value.

That is, if one or more of the multiple spools 210 are moved even though the multiple spools 210 need to be positioned at the positions at which the multiple spools 210 stop the supply of the main working fluid, the working device or the traveling device deviates from the control of the operator and arbitrarily moves, which causes a safety accident. However, according to the exemplary embodiment of the present disclosure, the pressure in the signal line 670 may be measured to effectively perceive whether one or more of the multiple spools 210 are moved even though the multiple spools 210 need to be positioned at the positions at which the multiple spools 210 stop the supply of the main working fluid.

The orifice 870 is installed in the signal line 670. The orifice 870 is provided to allow only an extremely small part of fluid discharged from the pilot pump 800 to flow into the hydraulic tank 880 along the signal line 670, and allow the remaining part of the fluid to be used for other devices. That is, the orifice 870 is a kind of resistive element disposed between the pilot pump 800 and the signal line 670.

If there is no orifice 870 described above, the fluid discharged from the pilot pump 800 flows into the hydraulic tank 880 without any resistance, such that the fluid discharged from the pilot pump 800 cannot be used for other devices, for example, the electronic proportional pressure reducing valves 260.

The control unit 700 controls the safety shut-off valve 950 depending on a manipulating signal of the manipulating device 790 of the construction machine which is manipulated by the operator. Specifically, the manipulating device 790 may include one or more of a joystick, a pedal, a thumb wheel, and the like.

In addition, in the exemplary embodiment of the present disclosure, when the pressure in the signal line 670 measured by the pressure sensor 750 exceeds a predetermined pressure value, the control unit 700 determines that one or more of the multiple spools 210 are unnecessarily moved, and the control unit 700 controls the safety shut-off valve 950 to block the pilot working fluid to be supplied to the multiple electronic proportional pressure reducing valves 260 through the pilot line 610. Here, the predetermined pressure value may be variously set in accordance with the types of construction machines. In this case, the control unit 700 may generate a failure/warning signal. The failure/warning signal may be transmitted to the operator through various methods publicly known to those skilled in the art.

Further, in the case in which the manipulating signal is generated by the manipulation of the manipulating device 790 of the construction machine, the control unit 700 controls the safety shut-off valve 950 to supply the pilot working fluid to the multiple electronic proportional pressure reducing valves 260 even though the pressure in the signal line 670 measured by the pressure sensor 750 exceeds the predetermined pressure value. In this case, the manipulating signal, which is generated by the manipulation of the manipulating device 790, may be generated only when the operator moves the manipulating device 790 by a reference value or more. The reason is to prevent a safety accident that is incurred when the manipulating device 790 reacts too sensitively such that the construction machine operates regardless of the operator's intention. In this case, the reference value may be variously set as necessary.

With this configuration, the safety system 101 for a construction machine according to the first exemplary embodiment of the present disclosure may effectively prevent a safety accident caused by a malfunction of the main control valve 200.

Hereinafter, an operating process of the safety system 101 for a construction machine according to the first exemplary embodiment of the present disclosure will be described in detail with reference to FIG. 3.

Figure 3:
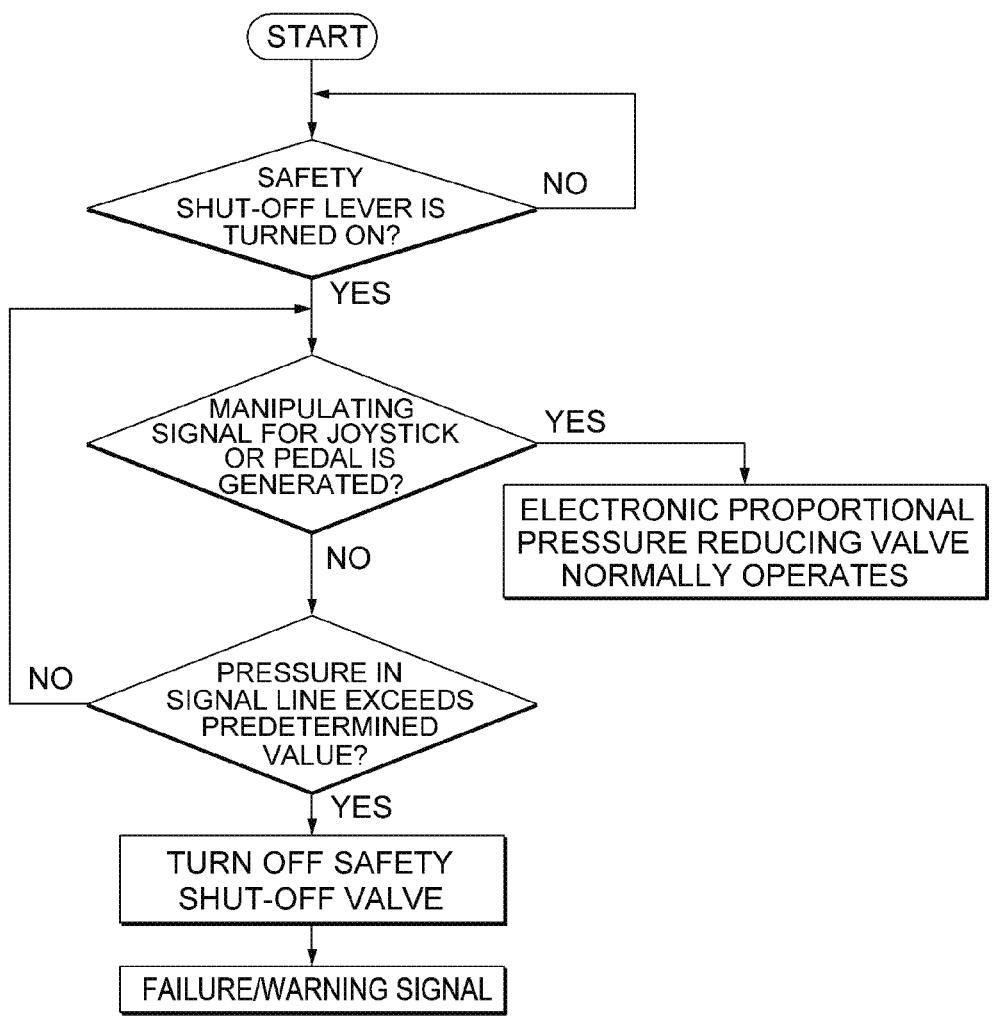
FIG. 3 is a flowchart illustrating an operating process of the safety system for a construction machine in FIG. 2.

As illustrated in FIG. 3, when the operator intends to perform work, the operator manipulates the safety shut-off lever 910 to turn on the safety shut-off valve 950 so that the work may be performed.

When the safety shut-off valve 950 is turned on, the pilot pump 800 may supply the pilot working fluid through the pilot line 610.

In this case, when the manipulating signal is transmitted from the manipulating device 790 by the manipulation of the operator, the electronic proportional pressure reducing valves 260 normally operate to move the spools 210. Further, as the spools 210 are moved, the main working fluid is supplied to the working device or the traveling device, such that the construction machine operates.

However, when the pressure in the signal line 670 measured by the pressure sensor 750 exceeds the predetermined value in a state in which the manipulating signal is not transmitted from the manipulating device 790, the control unit 700 determines that the spools 210 are unnecessarily moved, and the control unit 700 turns off the safety shut-off valve 950 in order to prevent the construction machine from arbitrarily operating.

When the safety shut-off valve 950 is turned off as described above, the pilot line 610 is blocked, such that the motions of the spools 210 are basically blocked.

In addition, the control unit 700 may generate the failure/warning signal while turning off the safety shut-off valve 950. Therefore, the operator may recognize a failure and a malfunction and take an action regarding the reason why the spools 210 are moved even though the manipulating signal is not transmitted from the manipulating device 790.

Hereinafter, a safety system 102 for a construction machine according to a second exemplary embodiment of the present disclosure will be described with reference to FIG. 4.

Figure 4:
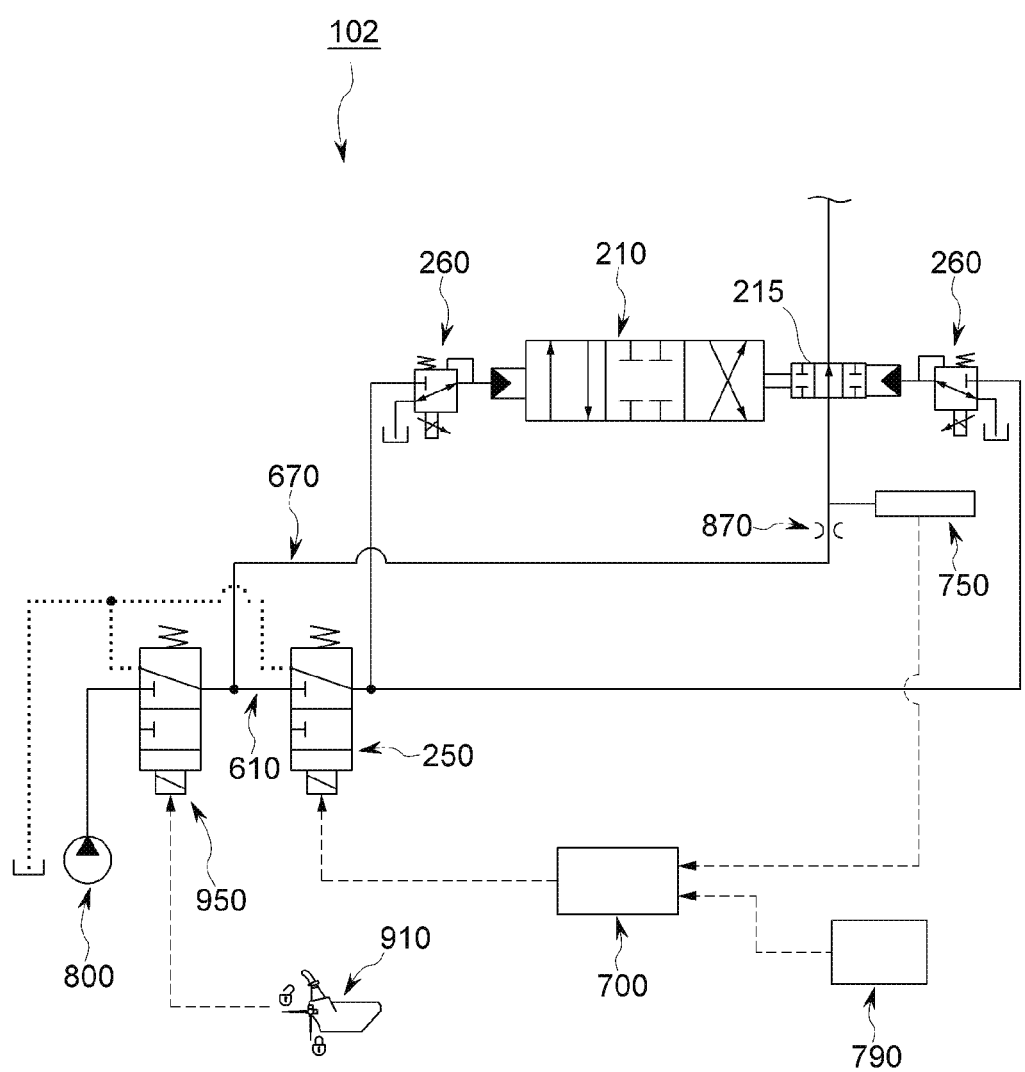
FIG. 4 is a configuration view illustrating a safety system for a construction machine according to a second exemplary embodiment of the present disclosure.

As illustrated in FIG. 4, the safety system 102 for a construction machine according to the second exemplary embodiment of the present disclosure further includes a pilot control valve 250 in addition to the configuration of the first exemplary embodiment.

In addition, in the second exemplary embodiment of the present disclosure, the safety shut-off valve 950 may be a general mechanical valve or a manual valve instead of an electronic control valve. That is, in the second exemplary embodiment of the present disclosure, the safety shut-off valve 950 is not controlled by the control unit 700.

The pilot control valve 250 is provided on the pilot line 610 between the pilot pump 800 and the multiple electronic proportional pressure reducing valves 260. More specifically, the pilot control valve 250 may be provided on the pilot line 610 between the safety shut-off valve 950 and the multiple electronic proportional pressure reducing valves 260.

In addition, the pilot control valve 250 controls the supply of the pilot working fluid toward the multiple electronic proportional pressure reducing valves 260 along the pilot line 610. Specifically, the pilot line may be opened when the pilot control valve 250 is turned on, and the pilot line may be blocked when the pilot control valve 250 is turned off. In addition, as an example, the pilot control valve 250 may be an electronic proportional pressure reducing solenoid valve (EPPR solenoid valve).

In addition, in the second exemplary embodiment of the present disclosure, the signal line 670 may extend and branch off from the pilot line 610 between the safety shut-off valve 950 and the pilot control valve 250.

However, the second exemplary embodiment of the present disclosure is not limited to the aforementioned configuration, and as illustrated in FIG. 2, the signal line 670 may extend and branch off from the pilot line 610 between the safety shut-off valve 950 and the pilot pump 800.

The control unit 700 may control the pilot control valve 250 depending on the manipulating signal of the manipulating device 790 of the construction machine which is manipulated by the operator.

In addition, in the second exemplary embodiment of the present disclosure, when the pressure in the signal line 670 measured by the pressure sensor 750 exceeds a predetermined pressure value, the control unit 700 determines that one or more of the multiple spools 210 are unnecessarily moved, and the control unit 700 controls the pilot control valve 250 to block the pilot working fluid to be supplied to the multiple electronic proportional pressure reducing valves 260 through the pilot line 610. Here, the predetermined pressure value may be variously set in accordance with the types of construction machines. In this case, the control unit 700 may generate a failure/warning signal. The failure/warning signal may be transmitted to the operator through various methods publicly known to those skilled in the art.

Further, in the case in which the manipulating signal is generated by the manipulation of the manipulating device 790 of the construction machine, the control unit 700 allows the pilot control valve 250 to supply the pilot working fluid to the multiple electronic proportional pressure reducing valves 260 even though the pressure in the signal line 670 measured by the pressure sensor 750 exceeds the predetermined pressure value. In this case, the manipulating signal, which is generated by the manipulation of the manipulating device 790, may be generated only when the operator moves the manipulating device 790 by a reference value or more. The reason is to prevent a safety accident that is incurred when the manipulating device 790 reacts too sensitively such that the construction machine operates regardless of the operator's intention. In this case, the reference value may be variously set as necessary.

With this configuration, the safety system 102 for a construction machine according to the second exemplary embodiment of the present disclosure may also effectively prevent a safety accident caused by a malfunction of the main control valve 200.

Hereinafter, an operating process of the safety system 102 for a construction machine according to the second exemplary embodiment of the present disclosure will be described in detail with reference to FIG. 5.

Figure 5:
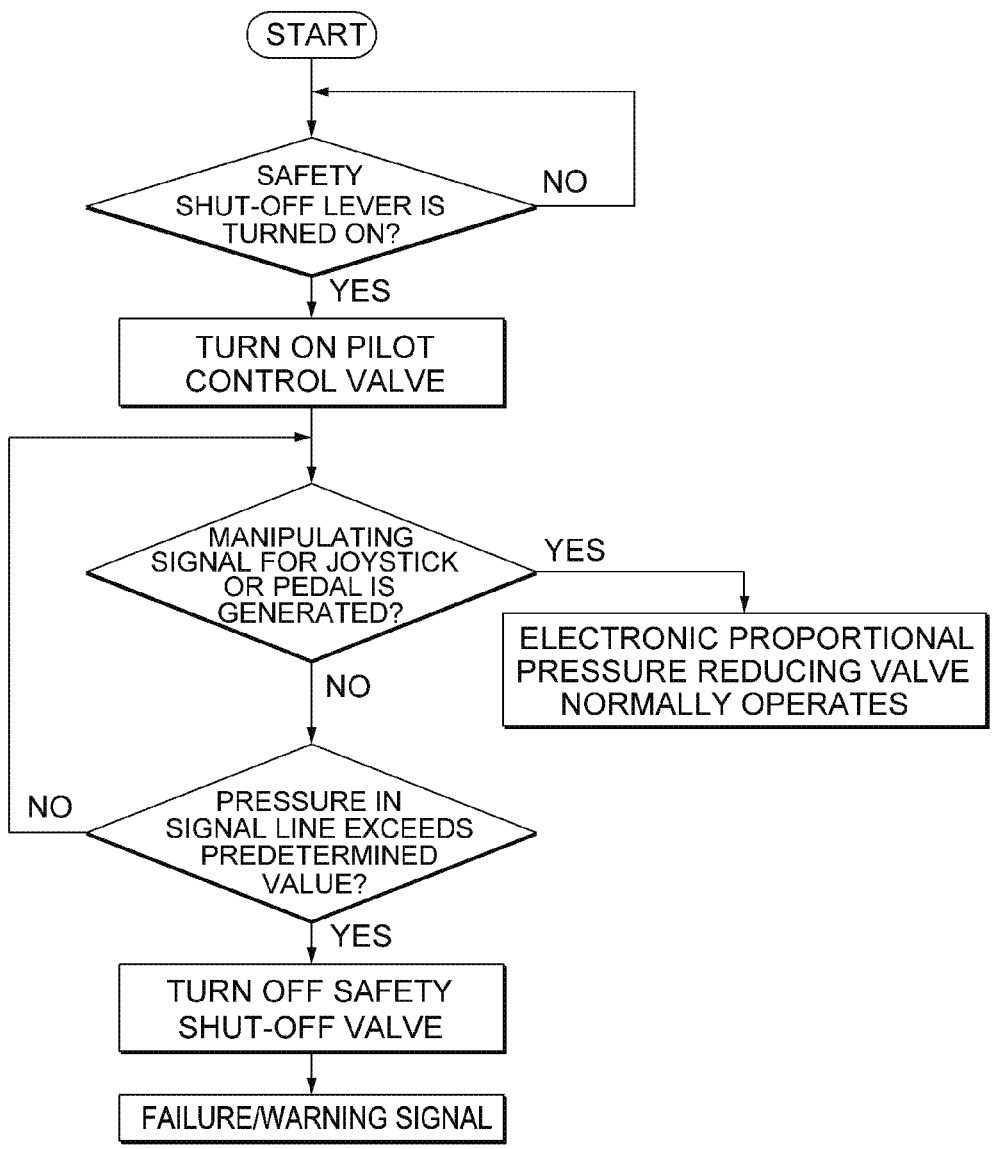
FIG. 5 is a flowchart illustrating an operating process of the safety system for a construction machine in FIG. 4.

As illustrated in FIG. 5, a state of the safety shut-off lever 910 is checked first. In the case in which the safety shut-off lever 910 is turned off, the pilot line 610 is in a state of being stably blocked, and as a result, it is possible to basically prevent an accident that is incurred when one or more of the multiple spools 210 are arbitrarily moved. The safety shut-off valve 950 is opened and closed by the manipulation of the safety shut-off lever 910.

When the operator intends to perform work, the operator manipulates the safety shut-off lever 910 to turn on the safety shut-off valve 950.

When the safety shut-off valve 950 is turned on, the pilot control valve 250 is also turned on so that the work may be performed, and as a result, the pilot pump 800 may supply the pilot working fluid through the pilot line 610.

In this case, when the manipulating signal is transmitted from the manipulating device 790 by the manipulation of the operator, the electronic proportional pressure reducing valves 260 normally operate to move the spools 210. Further, as the spools 210 are moved, the main working fluid is supplied to the working device or the traveling device, such that the construction machine operates.

However, when the pressure in the signal line 670 measured by the pressure sensor 750 exceeds the predetermined value in a state in which the manipulating signal is not transmitted from the manipulating device 790, the control unit 700 determines that the spools 210 are unnecessarily moved, and the control unit 700 turns off the pilot control valve 250 in order to prevent the construction machine from arbitrarily operating.

When the pilot control valve 250 is turned off as described above, the pilot line 610 is blocked, such that the motions of the spools 210 are basically blocked.

In addition, the control unit 700 may generate the failure/warning signal while turning off the pilot control valve 250. Therefore, the operator may recognize a failure and a malfunction and take an action regarding the reason why the spools 210 are moved even though the manipulating signal is not transmitted from the manipulating device 790.

While the exemplary embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned exemplary embodiments are illustrative in all aspects and are not restrictive, and the scope of the present disclosure shall be represented by the claims to be described below, and it should be construed that all of the changes or modified forms induced from the meaning and the scope of the claims, and an equivalent concept thereto are included in the scope of the present disclosure.

INDUSTRIAL APPLICABILITY

The safety system for a construction machine according to the exemplary embodiment of the present disclosure may be used to prevent a safety accident caused by a malfunction of the main control valve.

The invention claimed is:

1. A safety system for a construction machine, comprising:
   a pilot pump which supplies a pilot working fluid;
   multiple spools which are operated by the pilot working fluid to control a supply of a main working fluid and each have a signal unit formed in one region thereof;
   a signal line which sequentially connects the pilot pump, the signal units of the multiple spools, and a hydraulic tank;
   a pressure sensor which measures pressure in the signal line;
   multiple electronic proportional pressure reducing valves (EPPRVs) which are connected to the multiple spools, respectively, and control the pilot working fluid to be transmitted to the multiple spools;
   a pilot line which connects the pilot pump and the multiple electronic proportional pressure reducing valves; and
   a safety shut-off valve which is provided on the pilot line between the pilot pump and the multiple electronic proportional pressure reducing valves and controls the supply of the pilot working fluid.

2. The safety system of claim 1, wherein when the pressure in the signal line measured by the pressure sensor exceeds a predetermined pressure value, it is determined that one or more of the multiple spools are unnecessarily moved, and the safety shut-off valve blocks the pilot working fluid to be supplied through the pilot line.

3. The safety system of claim 2, further comprising:
   a manipulating device which is manipulated by an operator; and
   a control unit which controls the safety shut-off value depending on a manipulating signal of the manipulating device,
   wherein when the manipulating signal is generated by the manipulation of the manipulating device, the control unit allows the safety shut-off valve to supply the pilot working fluid through the pilot line even though the pressure in the signal line measured by the pressure sensor exceeds the predetermined pressure value.

4. The safety system of claim 3, wherein the control unit generates a failure/warning signal when the pressure measured by the pressure sensor exceeds the predetermined pressure value and the safety shut-off valve blocks the pilot working fluid to be supplied to the multiple electronic proportional pressure reducing valves.

5. The safety system of claim 1, wherein the signal line branches off from the pilot line between the pilot pump and the safety shut-off valve.

6. The safety system of claim 1, further comprising:
   a safety shut-off lever which manipulates the safety shut-off valve,
   wherein the supply of the pilot working fluid through the pilot line is cut off when the safety shut-off valve is turned off.

7. The safety system of claim 1, further comprising:
   a pilot control valve which is provided on the pilot line between the pilot pump and the multiple electronic proportional pressure reducing valves and controls the supply of the pilot working fluid.

8. The safety system of claim 7, wherein when the pressure in the signal line measured by the pressure sensor exceeds a predetermined pressure value, it is determined that one or more of the multiple spools are unnecessarily moved, and the pilot control valve blocks the pilot working fluid to be supplied through the pilot line.

9. The safety system of claim 8, further comprising:
   a manipulating device which is manipulated by an operator; and
   a control unit which controls the pilot control valve depending on a manipulating signal of the manipulating device,
   wherein when the manipulating signal is generated by the manipulation of the manipulating device, the control unit allows the pilot control valve to supply the pilot working fluid through the pilot line even though the pressure in the signal line measured by the pressure sensor exceeds the predetermined pressure value.

10. The safety system of claim 9, wherein the control unit generates a failure/warning signal when the pressure measured by the pressure sensor exceeds the predetermined pressure value and the pilot control valve blocks the pilot working fluid to be supplied to the multiple electronic proportional pressure reducing valves.

11. The safety system of claim 7, wherein the signal line branches off from the pilot line between the pilot pump and the pilot control valve.

* * * * *